(12) United States Patent
Honda

(10) Patent No.: US 6,513,162 B1
(45) Date of Patent: Jan. 28, 2003

(54) DYNAMIC VIDEO COMMUNICATION EVALUATION EQUIPMENT

(75) Inventor: Yoshizou Honda, Tokyo (JP)

(73) Assignee: Ando Electric Co., Ltd., Tokyo (JP)

( * ) Notice: Subject to any disclaimer, the term of this patent is extended or adjusted under 35 U.S.C. 154(b) by 0 days.

(21) Appl. No.: 09/196,531

(22) Filed: Nov. 20, 1998

(30) Foreign Application Priority Data

Nov. 26, 1997 (JP) .............................................. 9-325065

(51) Int. Cl.[7] .............................................. H04N 7/173
(52) U.S. Cl. ............................ 725/96; 725/95; 725/90; 725/98; 725/118; 725/148; 348/400.1; 348/402.1; 348/407.1; 375/240.28; 375/240.12; 375/240.13; 382/236; 382/238; 386/109; 386/111; 358/261.2; 358/430
(58) Field of Search .............................. 725/54, 90, 98, 725/118, 148, 95, 96; 375/240.28, 240.16, 240.13, 240.12, 240.27, 240.26; 348/400.1, 402.1, 407.1, 413.1, 415.1, 416.1, 425.2, 425.1; 382/236, 238; 386/109, 111; 358/261.2, 430

(56) References Cited

U.S. PATENT DOCUMENTS

| | | | | |
|---|---|---|---|---|
| 5,212,549 A | * | 5/1993 | Ng et al. ................ | 375/240.15 |
| 5,268,961 A | * | 12/1993 | Ng ............................ | 348/425.2 |
| 5,467,132 A | * | 11/1995 | Fazel et al. ............. | 375/240.01 |
| 5,587,807 A | * | 12/1996 | Ootsuka et al. .............. | 386/113 |
| 5,621,467 A | * | 4/1997 | Chien et al. ................. | 348/616 |
| 5,737,022 A | * | 4/1998 | Yamaguchi et al. ... | 375/240.15 |
| 5,848,266 A | * | 12/1998 | Scheurich .................... | 370/468 |
| 5,999,693 A | * | 12/1999 | Juri et al. .................... | 348/474 |
| 6,014,694 A | * | 1/2000 | Aharoni et al. ............. | 370/232 |
| 6,078,616 A | * | 6/2000 | Ozcelik et al. ........ | 375/240.16 |
| 6,330,365 B1 | * | 12/2001 | Yasuda et al. ........... | 348/425.2 |

* cited by examiner

Primary Examiner—Andrew Faile
Assistant Examiner—Jason Salce
(74) Attorney, Agent, or Firm—Flynn, Thiel, Boutell & Tanis, P.C.

(57) ABSTRACT

In a dynamic video communication evaluation equipment for analyzing codes by multiple methods for evaluating a dynamic video image, an analysis including estimation is performed to fix a reliability of the analysis result, enabling a processing termination in response to the analysis result in view of effective utilization of time or cost. The dynamic video communication evaluation equipment comprises a dynamic video code transmitter which transmits a dynamic video as a digital dynamic video code via a network by selecting it from multiple dynamic video coding methods and multiple communication protocols, a dynamic video code receiver for receiving and decoding the digital dynamic video code which are transmitted via the network conforming to the video coding method and communication protocol used for the digital dynamic video code, and a dynamic video communication analysis equipment composed of analysis means which calculates both of estimation value of dynamic video image quality evaluation value and an error range of said estimation value according to said dynamic video coding method and said communication protocol, and indication means to indicate said estimation value and said error range.

7 Claims, 7 Drawing Sheets

US 6,513,162 B1

DYNAMIC VIDEO COMMUNICATION EVALUATION EQUIPMENT

BACKGROUND OF THE INVENTION

1. Field of the Invention

The present invention relates to a dynamic video communication evaluation equipment, and more particularly to a dynamic video communication evaluation equipment for evaluating dynamic video code and protocol used to transmit and receive digital dynamic video data.

2. Description of the Related Art

Recently, wide area computer networks such as Internet have been developed, through which various types of data have been exchanged in a large scale. Conventionally, due to the bottleneck of computer processing speed and lower network throughput, only character information or compressed still video image having comparatively less amount of information were allowed to be exchanged.

However, thanks to recent rapid enhancement of the computer processing speed and enhanced network speed, dynamic video image having a large amount of information have become exchanged. Hereafter, it is unavoidable that the dynamic video image will be generally transferred without an analog signal via a TV set, etc. but with a digital data which can be processed by computers, which is however not limited to the above mentioned Internet, through various networks.

Under the background, it is very important to estimate the quality such as transfer speed of dynamic video data on the network for efficient use of the network resources.

An apparatus for evaluating the dynamic video code and protocol in a dynamic video communication has been proposed by the same inventor, for example, as disclosed in application Ser. No. 09/216,814 filed Aug. 11, 1997 (and corresponding U.S. Ser. No. 09/132,403 filed Aug. 11, 1998), the technology of which will be described hereinafter.

First of all, technical terms used in this application will be defined as follows A communication protocol is a protocol on communication which is also used in a communication other than a dynamic video such as UDP/IP(User Diagram Protocol/Internet Protocol), and also includes a communication for performing a negotiation before data is transmitted and received between a transmitter and a receiver.

A dynamic video coding method is a protocol relating to a dynamic video code and it includes transmission/reception, decoding indication intended for communication of the dynamic video, and regulations which have determined between network equipment.

For example, there are MPEG (ISO/IEC-11172), MPEG-2 ISO/IEC-13818), MPEG-4 (ISO/IEC-14496), in accordance with ISO (International Organization for Standardization), IEC (International Electromechanical Commission), and ITU (International Telecommunication Union) recommendations H. 320, H. 324, H. 261, and H. 263.

The standardization and recommendations set forth above describe a combination of multiple dynamic video coding methods. For example, there is a dynamic coding method such as a directional estimation method and a unidirectional estimation method wherein they are used commonly to the MPEG, MPED-2, MPED-4 and H. 263.

Further, a dynamic video communication protocol is a protocol for use in a dynamic video communication and it is used for a combination of the dynamic video coding method and the communication protocol. For example, it is such a case that a data stream produced in accordance with the MPEG is transmitted with packet conforming to the UDP/IP.

Then uses of the dynamic video communication protocol will now be described. In the. dynamic video communication protocol, the optimum protocol is diversified depending on the utilization object or the utilization condition of the dynamic video communication. There are various types such as a method that is high in coding rate with small coding amount, a method that is short in coding processing delay time, and a method that is unsusceptible to the influence of the transmission error.

A processing of the dynamic video communication protocol including coding/decoding processing in the transmitter and receiver of the dynamic video communication enables a software processing because a processing speed of a CPU (central processing unit) provided in the equipment such as transmitter/receiver is improved. Further, since the software is easily distributed via a network, the dynamic video communication protocol can be easily changed by the transmitter/receiver.

Under the circumstances, it is important to select and utilize a dynamic video communication protocol in accordance with a utilization object and a utilization network among various dynamic video communication protocols. Accordingly, there is "a dynamic video communication control equipment" as disclosed in Japanese Patent Application No. 09-216814 by the same inventor of this application as an example for providing means for selecting a dynamic video communication protocol for evaluating a dynamic image quality in a receiver or a relay to assure high quality. The dynamic video communication control equipment includes means for obtaining various hierarchy and kinds of information from the receiver or the relay, and executes analysis processing to calculate the dynamic video image quality parameters.

The communication protocol video image quality parameters calculate values indicating 5 categories, however in this application, a conventional technique will be explained while dynamic video communication control equipment is arranged for simplification and the dynamic video communication protocol video image quality parameters are served as a single image quality evaluation value with a simplified construction.

FIG. 7 is a block diagram showing the construction of a conventional dynamic video communication control equipment.

As shown in FIG. 7, in the dynamic video communication control equipment, a dynamic video code transmitter 10 and a dynamic video code receiver 30 are respectively connected to a network 20, and a dynamic video communication analysis equipment 40 is connected to the dynamic video code receiver 30.

The dynamic video code transmitter 10 transmits a dynamic video code to the dynamic video code receiver 30 via the network 20. The dynamic video code and a communication protocol received by the dynamic video code receiver 30 influence image quality in the dynamic video code receiver 30. The dynamic video code receiver 30 transmits dynamic video code and the communication protocol data that are received thereby to the dynamic video communication analysis equipment 40 as quality data in view of evaluating quality of received code and data.

The dynamic video communication analysis equipment 40 comprises multiple analysis processing parts 42a, 42b, . . . of different types of methods. Respective analysis processing parts 42a, 42b, . . . receive quality data outputted from the dynamic video code receiver 30, and analyze based on this quality data, and then output the analysis result as an image evaluation value.

There is a case where all the analysis processing parts 42a, . . . receive common quality data, and there is another case where the respective analysis processing parts 42a, 42b, . . . receive different image quality data.

There are provided image quality evaluation value memories 44a, 44b, . . . at the rear stages of respective analysis processing parts 42a, . . . The image quality evaluation value memories 44a, 44b, . . . respectively temporality store image evaluation values outputted from the analysis processing parts 42a, 42b, . . . There is provided an indication part 46 at the rear stages of the image quality evaluation value memories 44a, 44b, . . . The indication part 46 has an indication unit such as a display and indicates image evaluation values respectively outputted from the image quality evaluation value memories 44a, 44b, . . .

The problems of the conventional technique will be now described although the dynamic video communication control equipment has been described above.

Described next is a case where the transmission timing is controlled under the condition that where a real time communication of a dynamic video code, namely, a code reception for preserving time characteristics of a dynamic video is in time when coding, and the amount of buffering of the imaginary code that waits decoding at a decoding part is not continues increased.

In the conventional dynamic video communication evaluation equipment, the analysis processing method is normally performed by directly comparing an original image with a reception image, or in the case of analyzing image characteristics by constructing the image, the analysis processing scale becomes larger than a decode processing scale. Accordingly, there is a case that the analysis processing is not in time for the dynamic video code to be received at a processing speed that is equivalent to or lower than a decode processing speed.

In this case if the analysis processing is performed while exceeding a storage allowable amount, there is employed a method to intermittently take the codes to be analyzed therein.

If this method is employed, it is necessary to employ a method for estimate dynamic video image quality for evaluating the entire dynamic video image because the codes to be analyzed are a part thereof Because of the estimation, the dynamic video evaluation values outputted from the analysis processing parts are those which are likely to be certain, and hence estimation error range is accompanied therewith.

However, according to this conventional method, the estimation error is not indicated, leading to a problem that a rough estimation value and an estimation value with high precision value are not differentiated from each other.

Further, in the case having multiple analysis processing parts 42a, 42b, . . . of different types of methods as shown in FIG. 7, time for outputting the analysis result by the analysis processing parts 42a, 42b, . . . , and cost by the analysis processing parts 42a, 42b, . . . are diversified. If a communication cost involved in the transmission of the quality data is required, the communication time and analysis processing time are diversified, leading to various costs necessary for communication costs.

It is a general tendency to obtain a result in small estimation error as the analysis takes time and cost. There is a case where no correlation exists between the time and cost involved in an analysis and the obtained estimation error.

Accordingly, it is not always expected that the estimation error gradually decreases as the analysis result is obtained later.

Assuming that, quality data required for analysis for the analysis processing part processing part 42a to perform analysis of 1 k byte, and transmission speed is 0.7 seconds, and the time required for outputting a processing result at the analysis processing part processing part 42a upon completion of the transmission is 0.3 seconds.

Meanwhile, assuming that, quality data required for the analysis processing par 42b is 1M byte, and the transmission speed is 10 minutes, and the time required for outputting the processing result at the analysis processing part 42b upon completion of the transmission is 50 minutes.

Still further, assume that as a result of taking time and cost for the preparation of data although quality data needed for analyzing at another analysis processing part, not shown, is only dynamic video code 10 bytes, it takes 9.9 seconds for transmission, and 0.1 second for outputting processing results from the analysis processing part upon completion of the transmission.

Time required from the start of image data transmission to the output of analysis results is 1 second at the analysis processing part 42a, 1 hour at the analysis processing part 42b, and 10 seconds at another analysis processing part, not shown.

Considering that costs involved in communication is proportional to the amount of data, the communication costs involved in respective analysis processing parts are 10 yen at the analysis processing part 42a, 10,000 yen at the analysis processing part 42b, and 0.1 yen at the analysis processing part, not shown, assuming that it costs 1 yen per 100 bytes.

The respective analysis processing parts include estimation, and this estimation is not largely different therebetween compared with the amount of input data, the time and cost as set forth above.

For users of the dynamic video communication analysis equipment to perform the evaluation of the dynamic video image quality, under the limited condition of time or cost, it is required to determine whether an estimation error contained in an analysis result to be outputted is justified in terms of time or cost.

Since, however, it is not expected due to the above mentioned limitation either to perform an analysis for a long time to obtain a result with smaller estimation error using multiple analysis processing methods, or to wait for processing results by means of expensive processing method, there was a problem that users could not verify whether the expected analysis result was obtained or not.

Moreover, although for users of the above mentioned dynamic video communication analysis equipment who intend to evaluate the dynamic video image quality and have an allowance criteria in advance for the estimation error that is achieved, it may be desirable to terminate the dynamic video image quality evaluation at the time when any estimation error from multiple analysis processings which is under the allowance criteria for the first time is outputted, there was likewise a problem that the users could not determine whether the desired result is achieved or not as a analysis result.

Further, when there is no large difference between estimation errors from multiple analysis processings, it may be desired to terminate the evaluation of dynamic video image quality, according to the distribution of estimation values from multiple analysis processings, if the distribution shows a concentration about a particular value. However, the users could not verify whether the expected analysis result was obtained or not as well.

SUMMARY OF THE INVENTION

The present invention intends to solve the above mentioned problems by providing dynamic video communication evaluation equipment for allowing users to achieve a dynamic video image quality evaluation. More specifically, the present invention intends to provide the dynamic video communication evaluation equipment which allows dynamic video image quality evaluation according to the following various users' judgment criterion:

(1) differentiating between a rough estimation value and an estimation value by high precision analysis (2) differentiating between an analysis processing with a rough estimation and that with a high precision (3) achieving an analysis result efficiently at a limited time (4) achieving an analysis result efficiently at a limited cost (5) terminating a dynamic video image quality evaluation processing while directly viewing the range of estimation value of analysis result from multiple analysis processing methods (6) terminating a dynamic video image quality evaluation when an allowable analysis result is firstly obtained against the predefined allowance criteria of estimation error.

To achieve the above objects, the dynamic video communication evaluation equipment is characterized in comprising a dynamic video code transmitter which transmits a dynamic video as a digital dynamic video code via a network by selecting it from multiple dynamic video coding methods and multiple communication protocols, a dynamic video code receiver for receiving and decoding the digital dynamic video code which are transmitted via the network conforming to the video coding method and communication protocol used for the digital dynamic video code, and a dynamic video communication analysis equipment composed of analysis means which calculates both of estimation value of dynamic video image quality evaluation value and an error range of said estimation value according to said dynamic video coding method and said communication protocol, and indication means to indicate said estimation value and said error range.

Further, the dynamic video communication analysis equipment according to the present invention is characterized in comprising multiple analysis means of different types which analyze said dynamic video coding method and said communication protocol that are received, estimation value storage means which is provided in each of said multiple analysis means and stores therein the estimation value calculated by the multiple analysis means, and error range storage means which is implemented in each of said multiple analysis means and stores said error range calculated by said analysis means.

Further, the dynamic video communication analysis equipment according to the present invention is characterized in calculating in advance each processing time for each of the multiple analysis means, then performs the processing in the order of shorter processing time.

Further, the dynamic video communication analysis equipment according to the present invention is characterized in calculating in advance each processing cost for each of the multiple analysis means, then performs the processing in the order of smaller processing cost.

Further, the indication means according to the present invention is characterized in updating the indication by updating the estimation value stored in said estimation value storage means or updating the error range stored in said error range storage means.

Further, the indication means according to the present invention is characterized in indicating all of said estimation values stored in said estimation value storage means.

Further, the indication means according to the present invention is characterized in indicating both of the estimation value stored in the estimation value storage means corresponding to the analysis means related to the error range storage means which stores the smallest error range, and the error range stored in said error range storage means.

Further, the said dynamic video communication analysis equipment according to the present invention is characterized in including an output means for outputting the estimation value and the error range.

PREFERRED EMBODIMENT OF THE INVENTION

A dynamic video communication evaluation equipment according to a preferred embodiment of the present invention will be now described with reference to the attached drawings.

Figure 1:
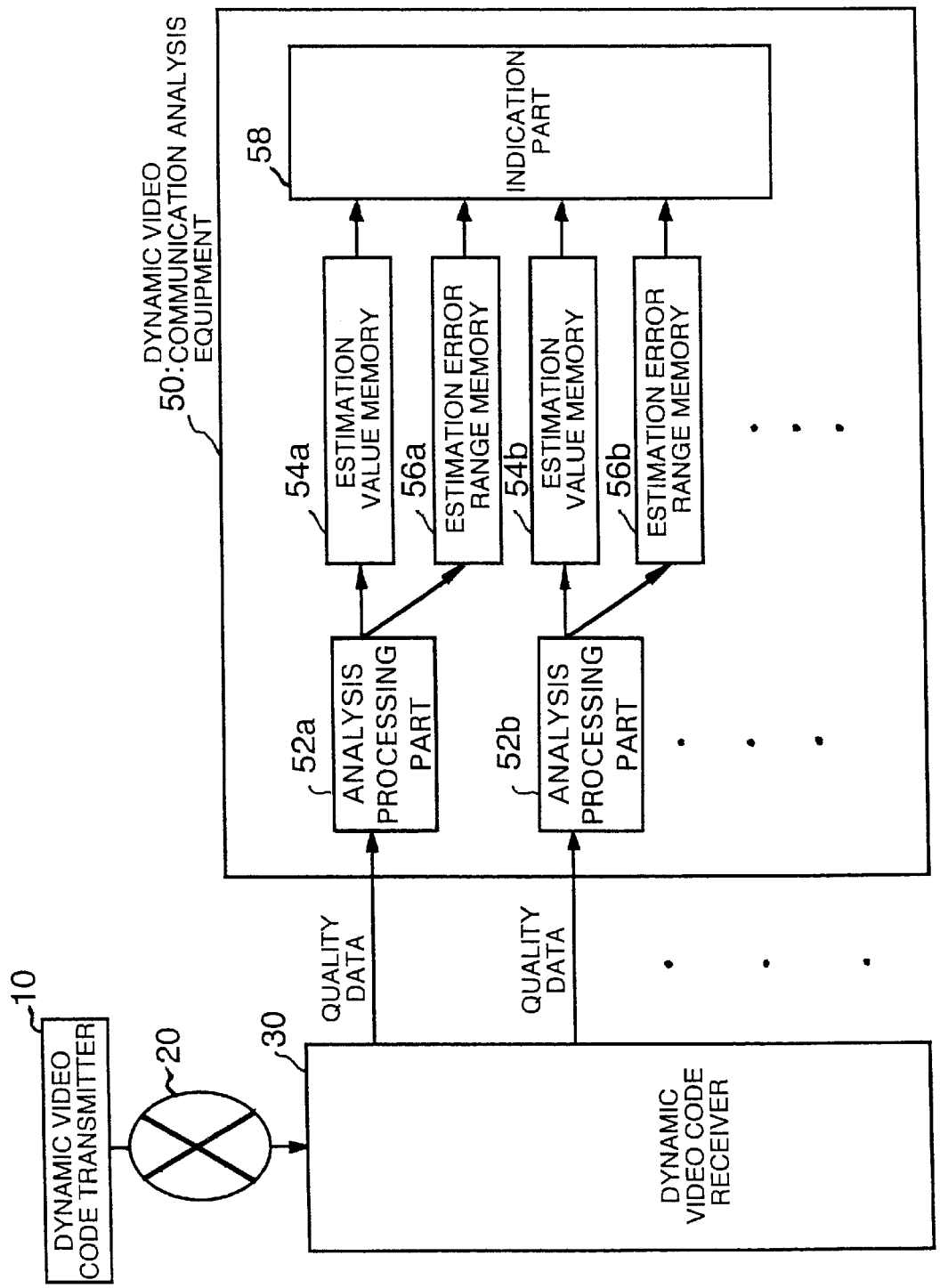
FIG. 1 is a block diagram showing the construction of a dynamic video communication evaluation equipment according to a preferred embodiment of the present invention.

FIG. 1 is a block diagram showing the construction of the dynamic video communication evaluation equipment according to the preferred embodiment of the present invention. The summary of this equipment will be first described.

As shown in FIG. 1, the dynamic video communication evaluation equipment of the present invention comprises a dynamic video code transmitter 10 and a dynamic video code receiver 30 which are respectively connected to a network 20, and a dynamic video communication analysis equipment 50 connected to the dynamic video code receiver 30.

The dynamic video code receiver 30 transmits received dynamic video code and communication protocol data to the dynamic video communication analysis equipment 50 as quality data.

The dynamic video communication analysis equipment 50 includes multiple analysis processing parts 52a, 52b, . . . having different types of methods. Respective analysis processing parts 52a, 52b, . . . receive quality data outputted from the dynamic video code receiver 30, and perform analysis based on this quality data to obtain an estimation value and estimation error range.

There is a case where all the analysis processing parts 52a, 52b, . . . receive common quality data and a case where respective analysis processing parts 52a, 52b, . . . receive different kind of quality data.

Estimation value memories 54b, . . . and estimation error range memories 56a, 56b, . . . are respectively provided at the rear stage of analysis processing parts 52a, 52b, . . .

The analysis processing parts 52a, 52b, . . . output the analyzed estimation values to the estimation value memories 54a, 54b, . . . and at the same time output the estimation error ranges of the estimation values to the estimation error range memories 56a, 56b, . . .

The estimation value memories 54a, 54b, . . . temporarily store therein input estimation values and output them to an indication part 58. The estimation error range memories 56a, 56b, . . . temporarily store therein the input estimation error ranges and output them to the indication part 58. The indication part 58 indicates the inputted estimation values and the estimation error ranges. Every time the analysis result is outputted, the indication is updated. The manner of indication will be described later.

Next, the analysis processing at the analysis processing parts 52a, 52b, . . . will be described. As the dynamic video codes, those defined in MPED-2 (ISO/IEC-13818) are used.

The analysis processing part 52a receives a parameter meaning a dynamic video transmission of a human portrait as a quality data which is a utilization object in a TV telephone, a parameter indicating the maximum bit rate of a modem in an analog telephone network, and parameters of a screen size, a frame rate, a color difference format, and a unidirectional estimation use including a dynamic video parameter. A coding rate of a dynamic video of a human portrait is estimated based on these information.

Through the above description, terms "screen size", "frame rate", "color difference format" and "unidirectional estimation" are those defined in MPEG-2(ISO/IEC-13818), and detailed descriptions are omitted in this specification. Brief descriptions are however given below.

Screen size is the number of pixels that composing a screen assuming that a screen consists of various pixels and it is also referred to as resolution. A screen has normally a rectangular form and is represented with the numbers of vertical and horizontal pixels since they are arranged in a grid. Three primary colors are represented with the numbers corresponding to the brightness pixel.

Frame rate is the number of frames per unit time, where a frame refers to a still video screen assuming that a dynamic video consists of multiple continuous still video screens.

Color difference format refers to three primary RGB colors that are represented with digital data. It is normally represented with the brightness value and two types of color difference value for the compatibility with monochrome technology. Another format usually used is that represented, by thinning out the color difference value according to the visual sense characteristics, with a format of brightness for adjacent 2×2 pixels(=4) each assigned one of two color difference values.

Unidirectional estimation refers to a method of estimating an adjacent frame after the reference frame for reduced amount of code, especially referring to a type of inter-frame time estimation coding method in which a differential video image between standard and adjacent frames is coded, and the differential video image will be added to an adjacent frame for decoding.

On the contrary, a bidirectional estimation method intends to estimate an intermediate frame in terms of time between two reference frames by coding a differential image between both reference frames and interpolating frame.

The analysis processing part 52b, for example, receives dynamic video codes of several frames of dynamic video as a quality data, analyzes a type of the inter-frame time estimation coding method, calculates amount of codes in each frame type, and also estimates coding rate of an unanalyzed frame.

An analysis processing part, though not shown in FIG. 1, for example, receives as a quality data a parameter which indicates that the application is a dynamic video transmission of a human portrait, and as a dynamic video parameter a code such as SP@ML indicating a frequently generated combination of parameters, then estimates from these pieces of information a coding rate for the dynamic video of the human portrait.

The SP@ML refers to a comprehensive specification which is a combination of particular specification about the screen size, frame rate, color difference format and inter-frame time estimation coding method, and the detailed specification is defined in MPEG-2(ISO/IEC-13818).

In place of a coding rate used in the above mentioned analysis processing parts 52a, 52b, . . . , there is another case in which video image error rate is estimated. When a part of dynamic video code is lost due to a packet loss or transmission error, the analysis processing part 52b identifies each coding bit that is lost and its total influence on the video image for statistically estimating a video image error rate.

Comparing with other analysis processing parts, the processing time becomes much longer, however, with a comparatively less estimation error. If, in this case, there is received a quality data indicating whether the concealment function is provided or not on the dynamic video representation at the dynamic video code receive part 30, an estimation error in the video image error rate will become much smaller.

"Concealment" refers to a method to duplicate and indicate a video image located at the same position however in the next frame or located at the immediately above position in the frame in order to visually conceal the part of dynamic video code even if it was lost.

The operation of the dynamic video communication analysis evaluation equipment according to the first embodiment of the present invention will be now described hereinafter. The analysis time at the analysis processing parts 52a, 52b, . . . may be diversified.

Figure 2:
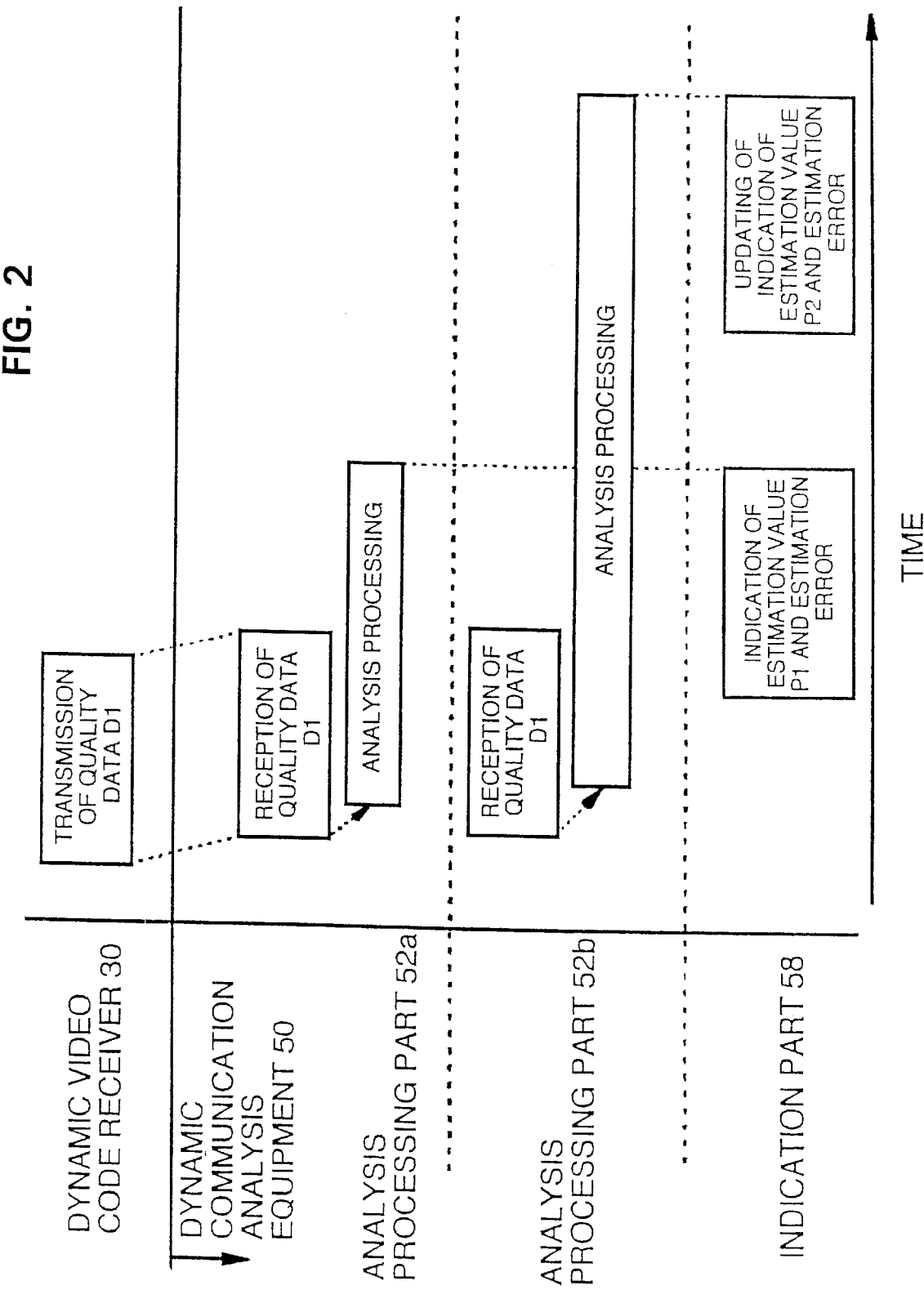
FIG. 2 is a timing chart showing processing steps when analysis processing parts 52a, 52b, . . . execute parallel analysis processings.

A case where multiple analysis processings are executed in parallel with one another will be first described. FIG. 2 is a timing chart showing processing steps for executing the parallel analysis processings by the analysis processing parts 52a, 52b, . . .

When a quality data D1 is transmitted from a dynamic video code receiver, the quality data D1 is inputted to the analysis processing parts 52a, 52b, . . . in a dynamic video communication analysis equipment 50 substantially at the same time.

It takes some time for the dynamic video code receiver 30 to complete the transmission of the quality data D1.

As shown in FIG. 2, the analysis processing parts 52a, 52b, . . . start the analysis processing after a lapse of a given time upon reception of the quality data D1 even if the reception of the quality data D1 is not completed.

The analysis processing parts 52a, 52b, . . . output evaluation values P1, P2 obtained by the analysis to the estimation value memories 54a, 54b upon completion of the analysis processing. Still further, estimation errors obtained by the analysis are respectively outputted to the estimation error range memories 56a, 56b.

The estimation values P1, P2 stored in the estimation value memories 54a, 54b, . . . and the estimation errors stored in the estimation error range memories 56a, 56b, . . . are respectively outputted to the indication part 58.

As shown in FIG. 2, the estimation values P1, P2 and the estimation errors are not outputted at the time when the processing at the analysis processing part 52a and the processing at the analysis processing part 52b are completed, namely, at the time of late processing, but they are outputted at the time when respective estimation value memories 54a, 54b, . . . completed the processings. Accordingly, the time when the estimation value P1 and the estimation error are inputted to the indication part 58 is different from the time when the estimation value P2 and the estimation error are inputted to the indication part 58.

Figure 3:
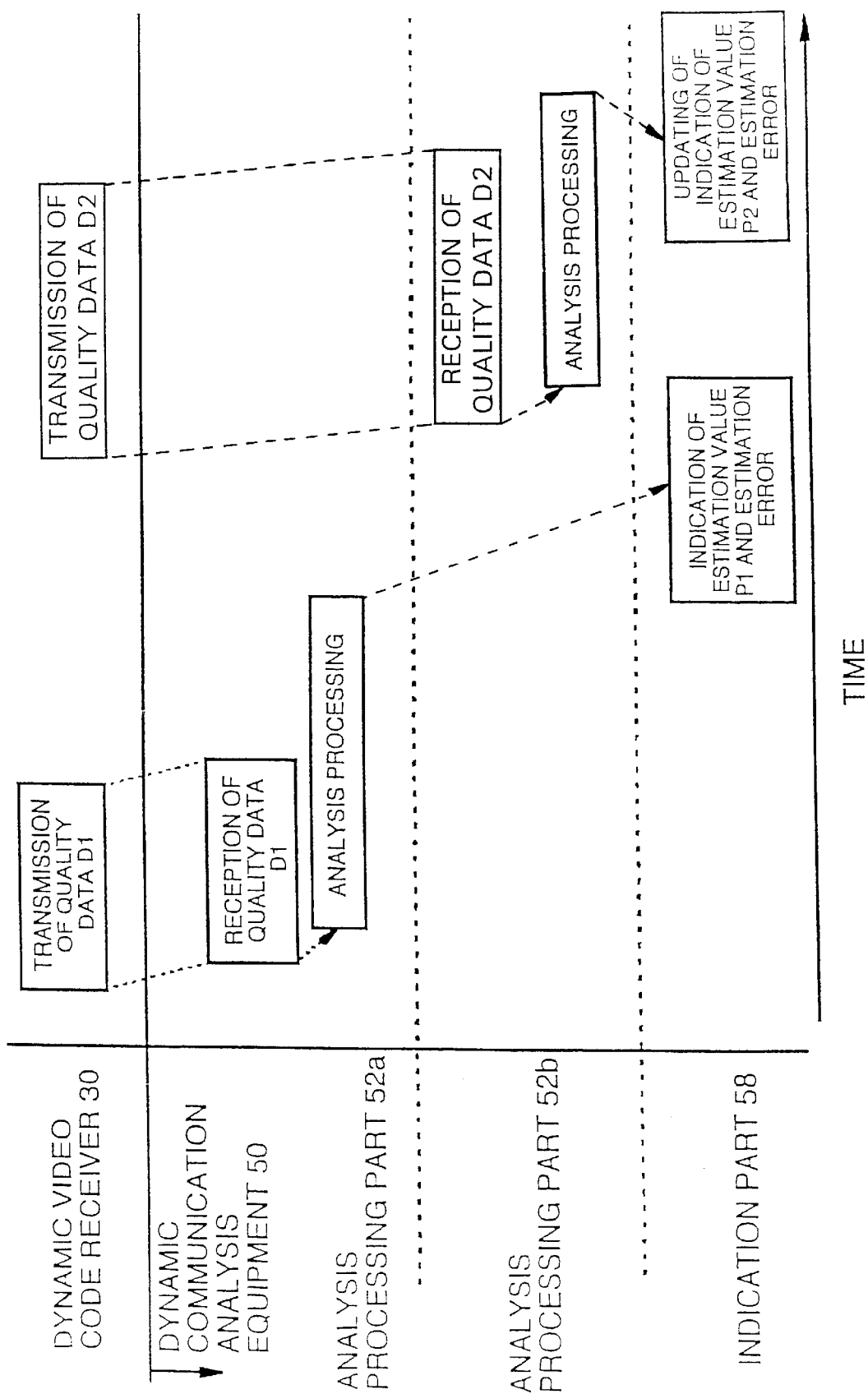
FIG. 3 is a timing chart showing processing steps when the analysis processing parts 52a, 52b, . . . sequentially execute analysis processings.

Described next with reference to FIG. 3 is a case where multiple analysis processings are sequentially executed. FIG. 3 is a timing chart showing processing steps when respective analysis processing parts 52a, 52b, . . . sequentially execute multiple analysis processings.

When the quality data D1 is transmitted from the dynamic video code receiver 30, it is inputted to the analysis processing part 52a in the dynamic video communication analysis equipment 50. It takes sometime for the dynamic video code receiver 30 to complete the transmission of the quality data D1.

When the analysis processing part 52a receives the quality data D1, an analysis processing is started after a lapse of a given time upon reception of the quality data D1.

The analysis processing part 52a outputs the estimation value P1 obtained by the analysis to the estimation value memory estimation value memory 54a upon completion of the analysis processing, and also outputs the estimation error obtained by the analysis to the estimation error range memory 56a.

The estimation value P1 stored in the estimation value memory 54a and the estimation error stored in the estimation error range memory 56a are respectively outputted to the indication part 58.

Next, when the quality data D2 is transmitted from the dynamic video code receiver 30, the quality data D2 is inputted to the analysis processing part 52b in the dynamic video communication analysis equipment 50. It takes sometime for the dynamic video code receiver 30 to complete the transmission of the quality data D2.

When the analysis processing part 52b receives the quality data D2, an analysis processing is started after a lapse of a given time upon starting of the reception of the quality data D2.

The analysis processing part 52b outputs the estimation value P2 obtained by the analysis to the estimation value memory 54b upon completion of the analysis processing, and also outputs the estimation error obtained by the analysis to the estimation error range memory 56b.

When the analysis processing parts 52a, 52b, . . . sequentially execute multiple analysis processings as mentioned above, time and cost which is more than necessary for users can be dispensed with every time the analysis result is outputted or whenever the users can terminate because the dynamic video image and the dynamic video image quality evaluation processing can be terminated at the time when the first allowable analysis result is obtained in the case where there is a limit of time or cost when users evaluate the dynamic video image or users has an allowance criteria in advance.

That is, after the analysis processing part 52a completes the analysis processing and the result is outputted to the indication part 58 in FIG. 3, the dynamic video code receiver 30 starts the transmission of the quality data D2. In this case, if the users intend to terminate the analysis processing with reference to the analysis processing result by the analysis processing part 52a indicated by the indication part 58, the analysis processing can be terminated, thereby dispensing with an additional analysis processing by the analysis processing part 52b to eliminate time and cost involved in the analysis processing by the analysis processing part 52b.

Further in the case of FIG. 3, the processing time of the multiple analysis processings is calculated in advance, then the processing is performed in the order of smaller processing time in the analysis means when there is a time limit for users. It is not necessary to execute the analysis processing which takes much time if the users are satisfied with the analysis result up to that time until the start of the analysis processing which takes much time.

Further in the case of FIG. 3, the processing cost of the multiple analysis processings is calculated in advance, then the processing is performed in the order of smaller processing cost in the analysis means when there is a cost limit for users. It is not necessary to execute the analysis processing which takes much time if the users are satisfied with the analysis result up to that time until the start of the analysis processing which takes much cost.

Next, the indication part 58 will be described more in detail.

The dynamic video image evaluation processing is terminated when the users have allowance criteria in advance and the first allowable result is obtained upon completion of the comparison by the indication part 58 between the analysis processing results (estimation value and estimation error) to be inputted to the indication part 58, resulting in knowing the result of high reliable processing method. The indication part 58 indicates the result of analysis on a display, etc: at the time of completion of the dynamic video image evaluation processing.

Figure 4A:
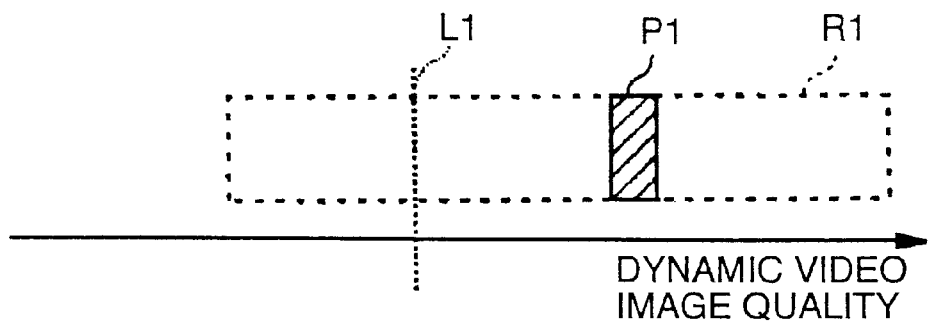
FIGS. 4(A) and 4(B) are views showing examples of a content of indication by an indication part 58.
Figure 4B:
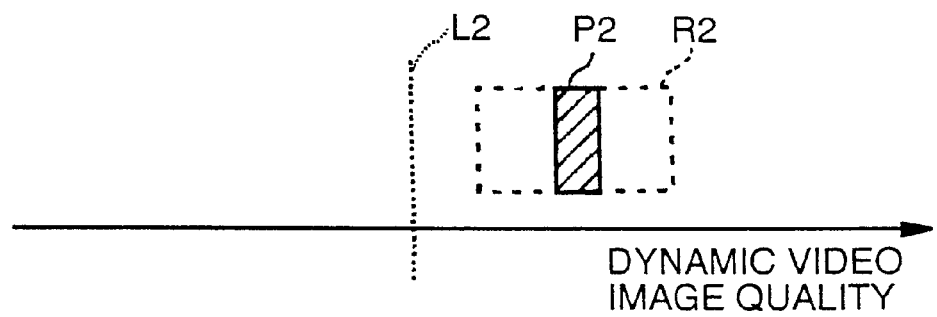

FIG. 4(A) and FIG. 4(B) respectively show examples of the content of indication. The analysis processing result having the smallest estimation error is indicated in Figs FIG. 4(A) and FIG. 4(B) as shown in FIGS. 2 and 3, the analysis result in the analysis processing part analysis processing part 52a and the analysis result in the analysis processing part 52b are respectively inputted to the indication part 58 at the time when these analysis results are different from each other.

When the first analysis result (the analysis result in the analysis processing part 52a in the examples of FIGS. 2 and 3) is inputted, the indication part 58 indicates the result based on the estimation value P1 and the estimation error of the analysis result to be inputted as shown in FIG. 4 (A).

In FIG. 4(A), a horizontal axis shows a dynamic video image quality. L1 represents an allowance criteria of a fixed accuracy which is input in advance by the users. P1 denotes a degree of deviation of the imputed estimation value ESTIMATION VALUES P1, P2 relative to the allowance criteria L1. A portion denoted by R1 shows an estimation error range based on an estimation error to be inputted.

In the example of FIG. 4(A) and FIG. 4(B), respective indication results up to that time and estimation errors are compared with each other when the analysis processing result is outputted, and if the new result is small in estimation error, the indication is updated but it is not updated in the reverse case.

That is, the indication is updated if the estimation value P2 of the analysis result, which is input after the termination of the analysis processing at the analysis processing part 52b, is smaller than the estimation value P1, and the analysis result at the analysis processing part 52b is indicated as shown in FIG. 4(B). In FIG. 4(B) the allowance criteria L2 can be input in advance by users. An estimation error range R2 is based on an estimation error to be input.

Another indicating method at the indication part 58 will be now described.

In this example, the indication part 58 does not compare the reliability of multiple analysis processing with one another but indicates a distribution of an estimation value by the various analysis processings. In such an indication, users directly view the content of indication, thereby terminating the dynamic video processing.

Figure 5A:
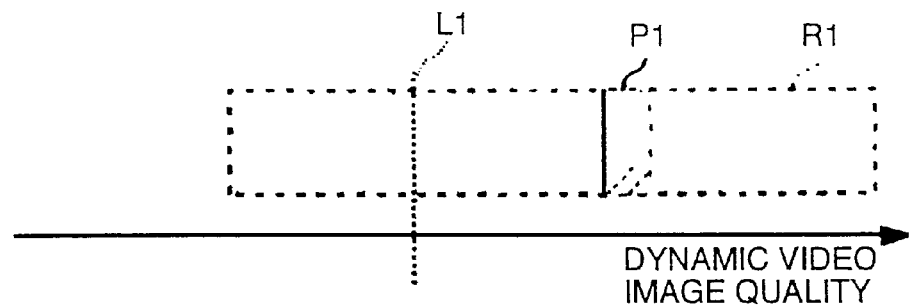
FIGS. 5(A) and 5(B) are views showing other examples of a content of indication by the indication part 58.
Figure 5B:
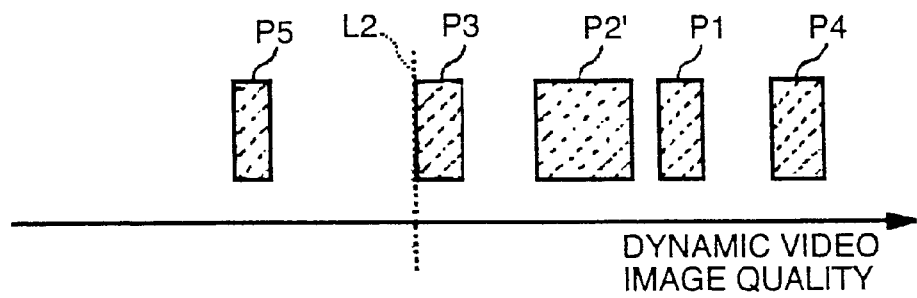

FIG. 5(A) and FIG. 5(B) show another indication example at the indication part 58.

In the case shown in FIG. 4, the indication is sequentially updated if the estimation value is smaller relative to the analysis result to be inputted to the indication part 58 in the time sequence.

In the case shown in FIG. 4(A), the indication is sequentially updated if the estimation value is smaller relative to the analysis result to be input to the indication part 58 in the time sequence.

In FIG. 5(B), since some estimation values are too close to each other, a duplication occurs at the location where a symbol P2' is marked.

If, as shown in FIG. 5(B), all estimation values P1, P2', P3, P4 and P5 are indicated, they frequently appear almost at the center of a distribution of the values. That is, as mentioned above, the duplication appears at the location of a mark P2', the object of the dynamic video image quality estimation is achieved, then the dynamic video image quality estimation processing can be terminated. Only the estimation value P5 is less than the allowance criteria L2 in FIG. 5(B).

Since, by integrating the aforementioned two types of indication methods concerning the indication part 58, estimation values and the estimation error range for multiple analysis processings are stored in the estimation value memory parts 54a, 54b, ... and the estimation error range memory parts 56a, 56b, ... in FIG. 1, then both indication methods in FIGS. 4(A), 4(b) and FIGS. 5(A), 5(B) can be switched with each other for indication as necessary.

The estimation value indicated in the indication part 58 is that belongs to a category of communication characteristics with a one-dimensional representation.

Figure 6A:
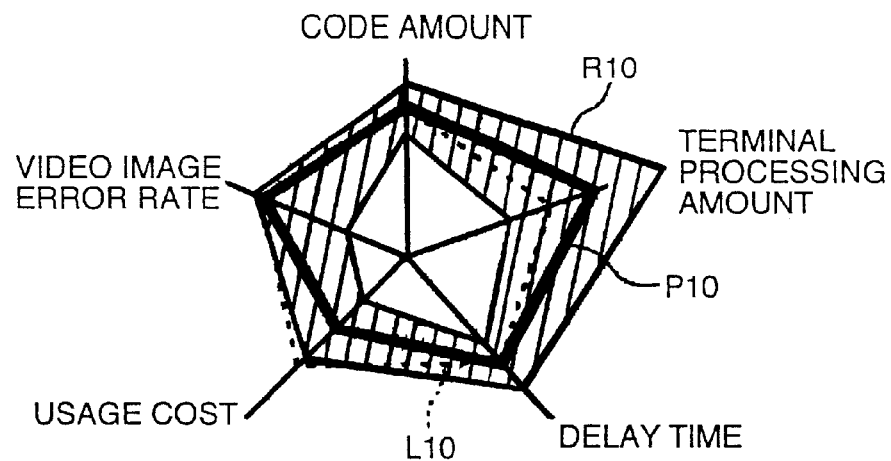
FIGS. 6(A) and 6(B) are views showing examples of a content of indication by the indication part 58 if there are multiple categories of video image.
Figure 6B:
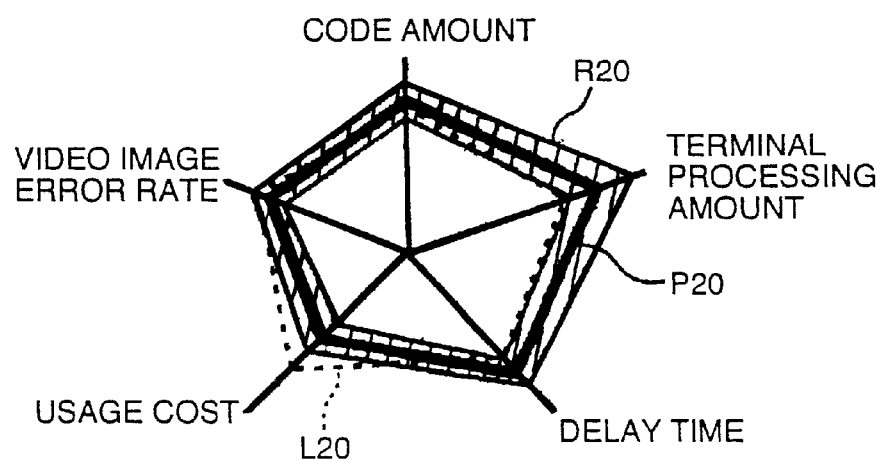
Figure 7:
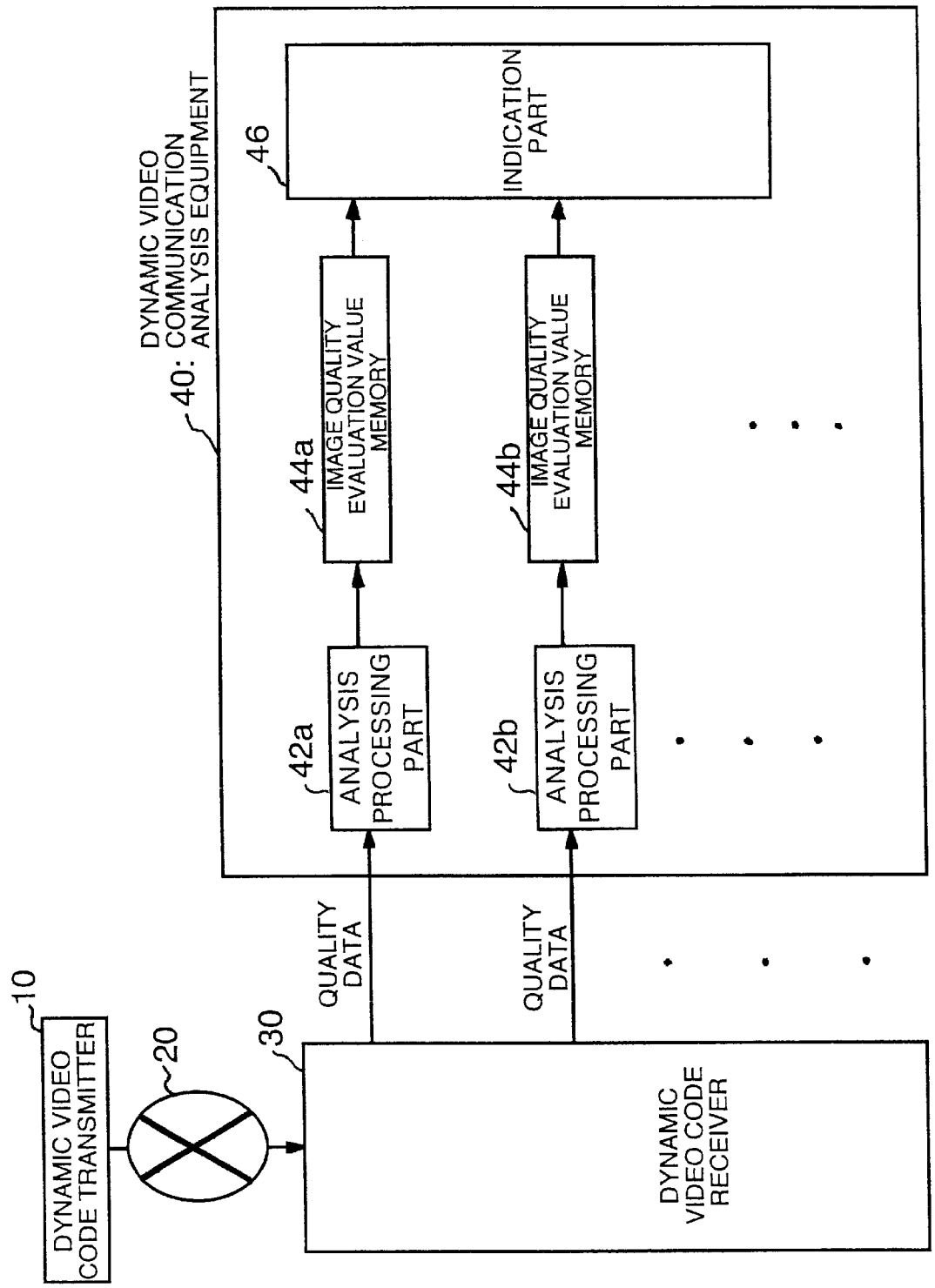
FIG. 7 is a block diagram showing the construction of a conventional dynamic video communication evaluation equipment.

A video image estimation value may be calculated for an analysis result concerning multiple categories. For example, in a "Dynamic video communication control equipment" as disdosed in Japan Patent Application No. 9-216814 calculate five categories of the video image estimation value shown below:

(1) amount of codes (2) video image error rate
(3) delay time
(4) terminal processing amount
(5) usage cost An example in FIGS. 6(A), 6(B) shows the estimation values to be calculated and their estimation errors concerning all of the above categories.

FIGS. 6(A), 6(B) show an example of indication on the indication part 58 when multiple categories are present.

In FIGS. 6(A), 6(B), each line segment radially extended from the center signifies a type among the aforementioned five categories of video image estimation values. FIG. 6(A) shows an indication example in the indication part 58 when an analysis is in progress.

A symbol R10 in the figure shows an estimation error range, and another symbol L10 shows a range of allowance criteria for each category using line segments. A symbol P10 also indicates the estimation value with line segments.

As shown in the figure, while an analysis being in progress, estimation errors indicated by R10 are larger, and uncertain whether they exceed values shown in L10 or not.

FIG. 6(B) shows an example of an analysis result. In the figure, a symbol R20 shows, an estimation error range, and another symbol L20 shows a range of allow criteria for each category using line segments. The symbol P20 also indicates an estimation value with line segments. As shown in the figure, the analysis result shows that estimation errors indicated by R20 becomes smaller, and the likelihood of the judgment becomes higher against the allowance criteria L20.

In the above embodiment of the present invention, a network 20 may be a single network or multiple different types of networks that are interconnected, where gateway equipment may be located at the interconnection point. A dynamic video code transmitter 10 and a dynamic video code receiver 30 may perform one to one communication, and one-to-multiple, or multiple-to-multiple types of communications are also allowed.

The dynamic video code receiver 30 may communicate with a dynamic video communication analysis equipment 50 via the network 20 or via other communication means. It also may have video image decoding means and indication means, or may have a means which once receives a dynamic video code and transmits it to another receiver, although not shown in the figure.

Further, the dynamic video communication analysis equipment 50 may have an output device for outputting an estimation value and an error range.

Although the dynamic video communication evaluation equipment has been described above, it is not limited to the embodiments, but may be changed variously within scope of the present invention.

As described above, according to the dynamic video communication evaluation equipment of the present invention, both of a rough estimation value and an estimation value with high precision analysis can be separately treated by means of a dynamic video code transmitter which transmits a dynamic video as a digital dynamic video code via a network by selecting it from multiple dynamic video coding methods and multiple communication protocols, a dynamic video code receiver for receiving and decoding the digital dynamic video code which are transmitted via the network conforming to the video coding method and communication protocol used for the digital dynamic video code, and a dynamic video communication analysis equipment composed of analysis means, which calculates both of estimation value of dynamic video image quality evaluation value and an error range of the estimation value according to the dynamic video coding method and the communication protocol, and indication means to indicate the estimation value and the error range.

The present invention also has another effect in treating separately both analysis processings with a rough estimation and analysis processings with higher precision since the dynamic video communication analysis equipment comprises multiple analysis means of different types which analyze the dynamic video coding method and the communication protocol that are received, estimation value storage means which is provided in each of the multiple analysis means and stores therein the estimation value calculated by the multiple analysis means, and error range storage means which is implemented in each of the multiple analysis means and stores the error range calculated by the analysis means.

The present invention also has another effect in that users can efficiently achieve the analysis result in a limited time, since the dynamic video communication analysis equipment calculates in advance each processing time for each of the multiple analysis means, then performs the processing in the order of shorter processing time.

The present invention also has another effect in that users can efficiently achieve the analysis result in a limited cost, since the dynamic video communication analysis equipment calculates in advance each processing cost for each of the multiple analysis means, then performs the processing in the order of smaller processing cost.

The present invention also has anther effect in that users can directly view a whole range of estimation value of analysis results obtained from multiple analysis processing methods for completing a dynamic video image quality evaluation processing, since the indication means indicates all of the estimation values stored in the estimation value storage means.

Further, the present invention also has another effect in that users who have an allowance criteria of estimation error in advance can terminate the dynamic video image quality evaluation processing when allowable analysis result is achieved for the first time, since the indication means indicates both of an estimation value stored in the estimation value storage means corresponding to the analysis means related to the error range storage means which stores the smallest error range, and the error range stored in the error range storage means.

What is claimed is:

1. A dynamic video communication evaluation equipment comprising:
   a dynamic video code transmitter which transmits a dynamic video as a digital dynamic video code via a network by selection from multiple dynamic video coding methods and multiple communication protocols;
   a dynamic video code receiver for receiving and decoding the digital dynamic video code which is transmitted via the network conforming to the video coding method and communication protocol used for the digital dynamic video code; and
   a dynamic video communication analysis equipment comprising multiple analysis units of different types which each analyze said dynamic video coding method and said communication protocol that are received from said dynamic video code receiver and which each calculate an estimation value of dynamic video image quality evaluation value and an error range of said estimation value according to said dynamic video coding method and said communication protocol, each of said multiple analysis units including an estimation value storage device that stores the estimation value calculated by the corresponding analysis unit and an error range storage device that stores the error range calculated by the corresponding analysis unit, said dynamic video communication analysis equipment including an indicating device to indicate said estimation values and said error ranges.

2. The dynamic video communication evaluation equipment according to claim 1, wherein said dynamic video communication analysis equipment calculates in advance each processing time for each of said multiple analysis units and then performs the processing in the order of shorter processing time.

3. The dynamic video communication evaluation equipment according to claim 1, wherein said dynamic video communication analysis equipment calculates in advance each processing cost for each of said multiple analysis units and then performs the processing in the order of smaller processing cost.

4. The dynamic video communication evaluation equipment according to claim 1, wherein said indicating device updates the indication by updating the estimation values stored in said estimation value storage devices or by updating the error ranges stored in said error range storage devices.

5. The dynamic video communication evaluation equipment according to claim 1, wherein said indicating device indicates all of said estimation values stored in said estimation value storage devices.

6. The dynamic video communication evaluation equipment according to claim 1, wherein said indicating device indicates the estimation value stored in the estimation value storage device corresponding to the analysis unit in which the error range storage device stores the smallest error range, and indicates the error range.

7. The dynamic video communication evaluation equipment according to claim 1, wherein said dynamic video communication analysis equipment includes an output device for outputting the estimation value and the error range.

* * * * *